(12) United States Patent
Plain et al.

(10) Patent No.: US 8,958,669 B2
(45) Date of Patent: Feb. 17, 2015

(54) METHOD FOR MANUFACTURING A NETWORK OF MICROLENSES AT THE ENDS OF A BUNDLE OF OPTICAL FIBRES, RELATED OPTICAL FIBRES AND RELATED USE

(75) Inventors: Jérôme Plain, Troyes (FR); Renaud Bachelot, Saint Andre les Vergers (FR); Pascal Royer, Troyes (FR); Xinhua Zeng, Hefei (CN); Safi Jradi, Moussey (FR)

(73) Assignee: Universite de Technologie de Troyes, Troyes (FR)

( * ) Notice: Subject to any disclaimer, the term of this patent is extended or adjusted under 35 U.S.C. 154(b) by 253 days.

(21) Appl. No.: 13/638,187

(22) PCT Filed: Mar. 22, 2011

(86) PCT No.: PCT/FR2011/050593
§ 371 (c)(1),
(2), (4) Date: Apr. 25, 2013

(87) PCT Pub. No.: WO2011/124803
PCT Pub. Date: Oct. 13, 2011

(65) Prior Publication Data
US 2013/0202263 A1    Aug. 8, 2013

(30) Foreign Application Priority Data

Mar. 31, 2010 (FR) ..................... 10 52400

(51) Int. Cl.
| | | |
|---|---|---|
| G02B 6/32 | (2006.01) | |
| G02B 6/02 | (2006.01) | |
| G02B 6/04 | (2006.01) | |
| G02B 6/26 | (2006.01) | |

(52) U.S. Cl.
CPC .............. *G02B 6/02295* (2013.01); *G02B 6/04* (2013.01); *G02B 6/262* (2013.01); *G02B 6/02042* (2013.01); *G02B 6/32* (2013.01)
USPC ................... 385/33; 385/15; 385/27; 385/31; 385/39

(58) Field of Classification Search
CPC ...... G02B 6/32; G02B 6/4206; G02B 6/4204; G02B 6/4214; G02B 6/4246; G02B 6/4292
USPC .................................. 385/15, 27, 31, 33, 39
See application file for complete search history.

(56) References Cited

U.S. PATENT DOCUMENTS

| 6,523,985 B2 * | 2/2003 | Hamanaka et al. ............ 362/554 |
| 6,856,712 B2 * | 2/2005 | Fauver et al. .................... 385/12 |
| 2002/0021501 A1 | 2/2002 | Kawashima et al. |
| 2003/0183152 A1 | 10/2003 | Shafeev et al. |

FOREIGN PATENT DOCUMENTS

| FR | 2798740 A1 | 3/2001 |
| FR | 2827968 A1 | 1/2003 |
| JP | 10 221547 A | 8/1998 |

OTHER PUBLICATIONS

Zheng et al., "High Speed Sub-Micrometric Microscopy Using Optical Polymer Microlens", Chinese Optics Letters, vol. 7, No. 10, Oct. 2009, pp. 901-903.
International Search Report dated Aug. 3, 2011 for corresponding appl. No. PCT/FR2011/050593.

* cited by examiner

*Primary Examiner* — Jennifer Doan
(74) *Attorney, Agent, or Firm* — Carter, DeLuca, Farrell & Schmidt, LLP

(57) ABSTRACT

The present disclosure relates to a method for manufacturing end microlenses of individual optical fibers which are part of a bundle or a multi-core fiber, including depositing a drop of a photopolymerizable solution on a first end of the bundle; adapting the size of the drop; applying light centered on a predetermined wavelength onto a second end of the bundle in order to selectively polymerize the drop; rinsing the first end using a methanol solution in order to obtain a network of individual optical fibers, each one of which is provided with a microlens at the first end of the multi-core fiber, the microlenses being physically separated from one another. The disclosure additionally relates to a bundle of microlensed fibers obtained by the method, as well as to the use of such a bundle, for example in medical or multiplexed imaging and/or in the coupling of optical fibers.

14 Claims, 2 Drawing Sheets

METHOD FOR MANUFACTURING A NETWORK OF MICROLENSES AT THE ENDS OF A BUNDLE OF OPTICAL FIBRES, RELATED OPTICAL FIBRES AND RELATED USE

CROSS-REFERENCE TO RELATED APPLICATIONS

This application is a U.S. National Stage Application filed under 35 U.S.C. §371(a) of International Application No. PCT/FR2011/050593, filed Mar. 22, 2011, which claims the benefit of and priority to French Application 10 52400 filed Mar. 31, 2010, the entire contents of which are incorporated by reference herein.

TECHNICAL FIELD OF THE INVENTION

The invention relates to the field of optics and more particularly to optics applied to optical fibres for the transmission of information. The invention thus concerns developments relating to micro-optics. It is a case more particularly of optical fibres one end of which is treated and modified; the fibres concerned are in particular so-called multicore fibres, that is to say ones consisting of a set or network of unit optical fibres wherein each of the ends is finally provided with a microlens distinct from the microlenses formed on the ends of the adjacent fibres. This arrangement makes it possible to create, at one end of a multicore fibre or of a bundle of unit optical fibres, a network of microlenses intended for example for applications in simultaneous and/or multiplexed imaging, in tomography or in simultaneous spectrometry.

It is a case of focusing the light of the ends of a bundle comprising a very large number (thousands) of optical fibres, in order to illuminate a given surface through the same number of micropoints.

PRIOR ART

Lensed optical monofibres and the methods of manufacturing same are known. For example the document FR 2 798 740 filed in the name of the applicant concerns monomode or weakly multimode optical fibres having, at at least one of the ends thereof, a numerical aperture. The end or ends of these fibres are provided at one of the ends thereof with a transparent polymer peak obtained by photopolymerisation. However, the method described in this document concerns solely monofibres and does not apply to multicore fibres. The transposition, which has been tested, to multicore fibres always causes polymerisation between the cores (the ends of the unit fibres), which constitutes a real problem to be solved if it is wished to move towards applications such as simultaneous imaging multiplexing.

The document FR 2 827 968 is also known, which concerns monomode or multimode optical fibres associated with end peaks of transparent polymer. This technology applies for example to four peaks of a single mode, for high modes in a multimode fibre where the peaks overlap. This document does not concern the multicore fibres according to the invention and the associated problem. Moreover, it is sought in this document to adapt the chemical composition of the peaks, via in particular the viscosity of its formulation.

Moreover, micro-optics have several lines of development for treating and/or modifying the ends of optical fibres in order to obtain a network of microlenses. As is known, light diverges at the end of an optical fibre opposite to the one through which a light beam is injected. Thus it has appeared necessary to focus the light at the fibre exit, in particular by providing lenses at these ends. A problem arises when the size and/or density of the fibres increases.

According to a first development, in order to manufacture a network of microlenses at the end of a bundle of fibres, chemical etching is carried out for fabricating glass points at the ends of each of the cores. A refinement consists of then effecting a controlled deposition of metal around the end of the unit fibres to be treated, followed by a deposition of resin and then chemical etching in order to leave clear the pointed ends of the fibres spaced apart.

Another line of development is based on the chemical etching of the ends of a set (between 50,000 and 60,000) of optical fibres arranged in a hexagonal network. A network of substantially cylindrical holes, the bottoms of which correspond to the ends of the unit fibres, is first of all obtained; then these holes are filled with dielectric microballs that serve as microlenses.

These known techniques are complex to implement and require numerous method steps and sometimes prove to be difficult to control, giving rise to problems of cost and reliability. The glass peaks also have mediocre optical qualities.

DISCLOSURE OF THE INVENTION

The invention aims to remedy the drawbacks of the prior art and in particular to propose a method of manufacturing microlenses at the ends of unit optical fibres forming part of a network of fibres or of a multicore fibre, comprising in particular the deposition of a drop (or capillarity meniscus) of photopolymerisable solution on a first end of the bundle or of said multicore fibre.

According to a first aspect of the invention, the method also consists of: —adapting the size of said drop, —injecting a light centred on a given wavelength at a second end of said multicore fibre or of the bundle of fibres, in order to polymerise said drop selectively, —rinsing said first end by means of a solution of a solvent such as methanol or ethanol in order to obtain a network of unit optical fibres each provided with a micro lens at the first end of the multicore fibre or of the bundle of fibres, said microlenses being physically separate from one another.

Specifically, the method consists of adapting the height of the drop according to its composition and so that said height is less than the distance measured substantially along the longitudinal axis of the multicore fibre, between said first end and a proximal surface containing intersections of the light beams issuing from each unit optical fibre.

According to one embodiment of the invention, the reduction in the size of said drop consists of a reduction in its thickness to approximately a few micrometers.

In accordance with another embodiment of the invention, the reduction in the size of the drop consists of a reduction in the angle A between the end plane of the multicore fibre and the plane of the tangent to the drop at the periphery, to a value of less than 10°.

"Plane of the tangent to the drop at the periphery" means the plane of the external surface of the drop at its peripheral contact with the end plane of the fibre or bundle of fibres.

According to one particularity of the invention, said photopolymerisable solution comprises a photopolymerisable monomer of the PETIA type in which a mixture is added comprising approximately 4% by weight of an agent of the methyldiethanolamine type and approximately 0.5% by weight of an agent of the eosin type.

Advantageously, a radical photopolymerisable solution sensitive to an inhibitor such as oxygen and/or 4-methoxyphenol is used, having a given photopolymerisation threshold and induced by said inhibitor such as oxygen and/or 4-methoxyphenol.

In addition, a source is used having a wavelength of around 0.532 micrometers in order to illuminate the second end of the multicore fibre or bundle of fibres.

Preferentially, said end is illuminated for a period of around one second.

By way of illustration, the adaptation of the size of the drop consists of putting the flat end of an external element of the fibre type having substantially the same outside diameter as the drop in contact with the distal curved end of the drop adhering to the first end of the multicore fibre, moving said ends away once the flat end has been loaded with a quantity of photopolymerisable solution, measuring the thickness and/or the angle A of the drop on the first end of the multicore fibre, and then, according to the result of the measurement, once again bringing the two ends closer together after any trace of solution has been removed from the flat end of the external element. This operation of bringing together is repeated until a predetermined thickness value or angle A is obtained.

The invention also relates to a bundle of unit optical fibres according to which all or some of said fibres are provided at one of the ends thereof with a microlens obtained by the method described above.

The use of a bundle of optical fibres obtained according to the method described above in medical or multiplexed imaging, in optical fibre coupling, forms part of the invention.

BRIEF DESCRIPTION OF THE FIGURES

Other features, details and advantages of the invention will emerge from a reading of the following description, with reference to the accompanying figures, which illustrate.

For more clarity, identical or similar elements are marked by identical reference signs in all the figures.

DETAILED DESCRIPTION OF AN EMBODIMENT

Figure 1:
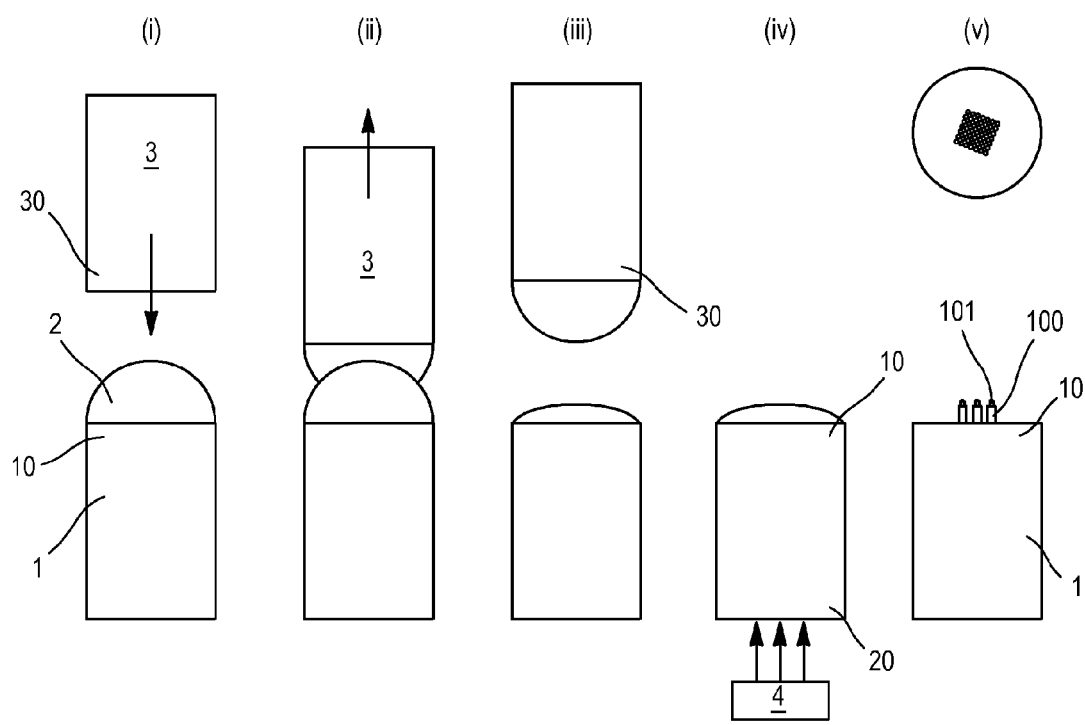
FIG. 1, several diagrams illustrating the main steps of the method according to the invention.

FIG. 1 shows the various main steps of the production method according to the invention. Firstly, for example using a pipette or an external fibre 3, a drop 2 of a photopolymerisable solution is deposited on a first end 10 of a bundle of fibres or a so-called multicore fibre 1. A multicore fibre 1 consists of a bundle of externally sheathed optical fibres 100. As will be explained below, the deposited solution is preferentially a solution based on a monomer such as PETIA in which at least one photoinitiator such as eosin is incorporated, as well as methyldiethanolamine (MDEA). For a preferred application of the invention, a mixture of 4% by weight of MDEA and 0.3% by weight of eosin is chosen.

Without departing from the scope of the invention, the photoinitiators may be modified in order to be adapted to a particular wavelength. Here the wavelength is around 0.532 micrometers.

Once the drop (or capillarity meniscus) 2 has been deposited on the first end 10 of the fibre or bundle of fibres 1, the size of this drop 2 is adapted. This adaptation consists generally of a reduction and more particularly a reduction in thickness and/or a reduction in the angle A between the end plane of the bundle of fibres and the plane of the tangent to the drop at the periphery.

Figure 1A:
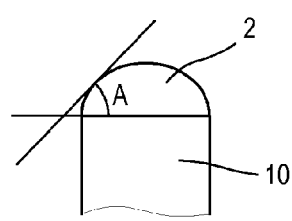
FIG. 1A is a simplified section of the first end of the bundle of fibres, provided with a large-volume drop.
Figure 1B:
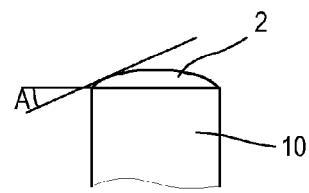
FIG. 1B is a simplified section of the first end of the bundle of fibres, provided with a small-volume drop.

FIGS. 1A and 1B specify how the angle A is determined: FIG. 1A corresponds to a drop 2 according to the first step of the method, with an angle A for example of around 23°; FIG. 1B corresponds substantially to a drop according to FIG. 1(iv) the size of which has been reduced, as will be explained below. Thus the final angle A may be around 8°.

According to an embodiment of the invention already tested, it is sought to reduce the angle A during the method.

Technically the reduction in thickness and/or angle is achieved by putting the end of an external element 3 of the fibre type having substantially the same outside diameter as the drop 2 in contact with the distal curved end of the latter. The bringing together of the ends is shown schematically in FIG. 1(i), and the contact in FIG. 1(ii). Next the ends are moved apart axially so that the end of the external element 3, initially free from any solution, is loaded with solution as can be seen in FIG. 1(iii); the volume of the drop 2 is thus reduced accordingly.

Figure 2:
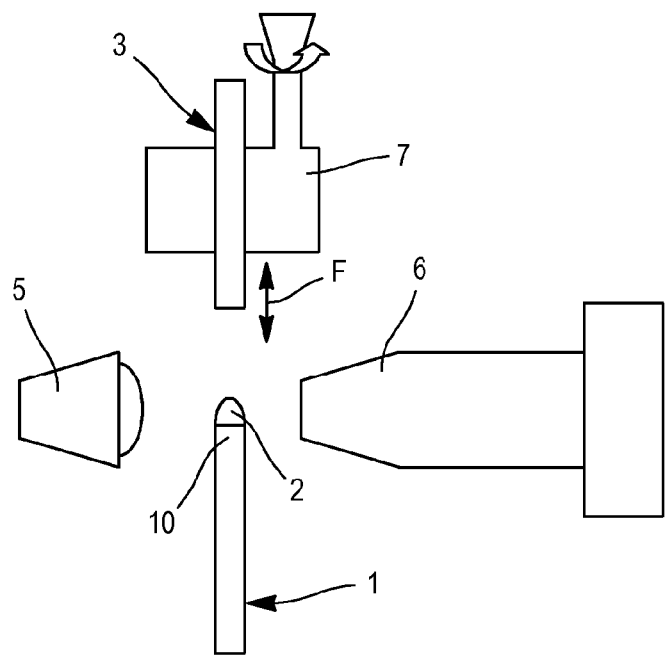
FIG. 2 is an outline diagram of equipment for reducing the size of a photopolymerisable liquid drop.

FIG. 2 shows an example of equipment used for effecting a controlled modification of the size (or volume) of the drop 2. Thus the first end 10 of the fibre 1 or of the bundle of fibres, provided with the drop 2, is disposed at a source of white light 5; opposite the source 5 a viewing system 6 is placed, comprising for example a lens and a camera for the purpose of fine viewing of the drop 2. In the longitudinal axis of the fibre 1 to be treated, the external fibre 3 is placed, supported and movable axially by means of a system 7 consisting for example of a plate and a micrometric screw. This arrangement makes it possible to move the fibres 1 and 3, or more precisely the respective ends thereof, closer together or further away axially. The arrow F in FIG. 2 shows this movement, which makes it possible to modify the size of the drop 2 of photopolymerisable solution, and to control this modification.

Any other means known per se enabling such adaptation associated with such a control may of course be used without departing from the scope of the invention.

It is a case of achieving a certain thickness value and/or angle A as precisely as possible. This is because the principle of the invention is based on the radical polymerisation threshold of the solution forming the drop 2, said threshold being induced by a polymerisation inhibitor such as oxygen or 4-methoxyphenol or any other equivalent inhibitor. The inhibitor kills the free radicals in the solution, vectors of the polymerisation, therefore preventing it from occurring. In order to pass beyond this threshold it is necessary to increase the photon energy (power or exposure time), which makes it possible to consume the inhibitor molecules to enable polymerisation. By adapting and in particular reducing the thickness of the layer of solution, or more particularly of the drop 2, the oxygen present outside the drop diffuses more rapidly as far as the irradiation zone and in this way polymerisation is limited. Thus the areas of less intensity, namely the areas between the cores, or unit fibre ends, will not induce polymerisation, and the areas situated at the ends of the unit fibres 100 will be able to be polymerised while being physically separate from one another.

Figure 3:
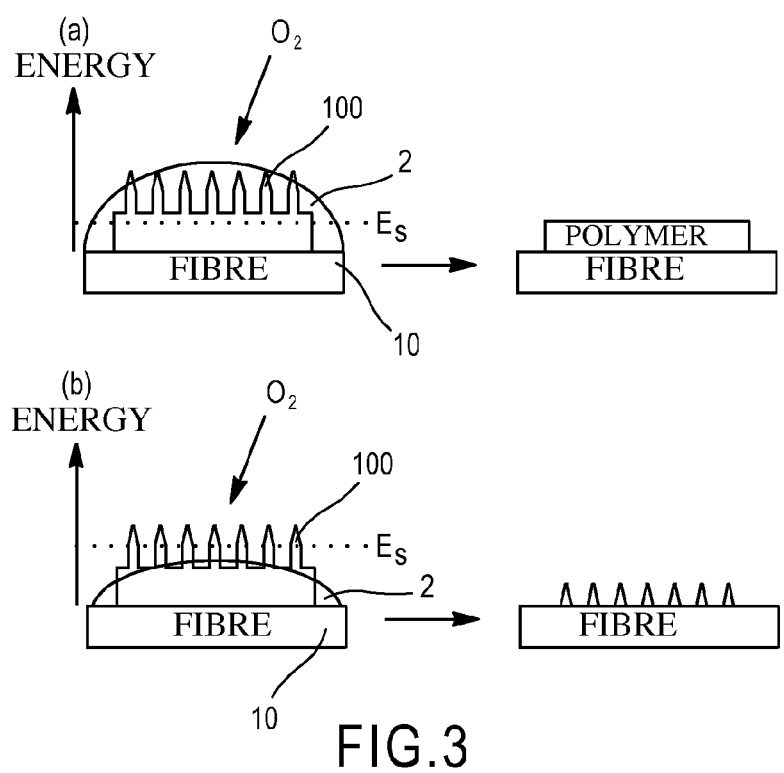
FIG. 3 is a diagram showing the radical polymerisation threshold.

FIG. 3 illustrates the principle stated above from which it is clear that: (a) if there is a drop 2 of large size and therefore great thickness, with a given threshold Es and a small quantity of oxygen, the entire end 10 of the bundle of fibres would be polymerised, over a certain thickness. In a different way (b) if the thickness of the drop is smaller (here around a few micrometers 5 and the polymerisation threshold Es is increased, then a certain Quantity of inhibitor will make it possible to selectively polymerise the ends of the fibres rather than the areas between the fibres (also referred to as the inter-core areas).

As already stated, it is therefore a case of precisely controlling the thickness of the drop 2 that is related to the radical polymerisation threshold of the deposited solution.

The dimension and in particular the height, the dimension measured along the longitudinal axis of the fibre, of the drop 2 must remain less than the distance measured along the same longitudinal axis, between the first end 10 of the multicore fibre and a proximal surface containing intersections of the light beams issuing from each unit fibre 100. The light beams each nave a substantially conical form, the smallest section of which is formed by the actual end of each unit fibre 100. The unit fibres 100 being placed substantially parallel to one another, the light beams have intersection areas beyond a certain distance from the end of the fibres 100. It will be sought to adapt the height (or thickness) of the drop 20 according to the overlap area, as defined above.

In addition, the height of the drop will depend on the composition of the photopolymerisable solution and in particular its concentration of inhibitors such as oxygen or 4-methoxyphenol.

Comparative tests have revealed that the eight of the microlenses 101 is directly correlated with the thickness of the solution deposited at the end 10 of the beam or of the fibre 1.

Once the size of the drop 2 has been obtained, the method continues by illuminating, by means of a source 4, the second end 20 of the multicore fibre 1, cf. FIG. 1(iv). This will cause the selective polymerisation sought at the first end 10 of the fibre 1.

Finally, according to step (v) of FIG. 1, it is a case of rinsing the first end 10 of the fibre 1 in order to eliminate any trace of polymerisation outside those formed at the end of the fibres 100, and which form the microlenses 101.

By way of illustration, a one (1) meter long multicore optical fibre 1 provided at the first end 10 thereof with a drop 2 having a thickness of 10 micrometers was irradiated from its second end 20 by a source with a wavelength of 532 nanometers with a power of 7 microwatts for a period of 2 seconds. Microlenses 101, all separated physically from one another, were thus obtained at the ends of the multicore optical fibre 1.

Thus the method described above, which is simple to implement, makes it possible to produce networks of microlenses 101 at one end 10 of a bundle of fibres or of a multicore fibre 1. These original and inventive structures form part of the scope of the present invention.

More generally the present invention makes it possible to obtain a bundle of microfibres wherein at least one of the ends 10 is provided with microlenses 101 that focus the light issuing from the other end 20 of the fibre, with a zero light intensity between the microlenses.

Highly interestingly, this particular beam may advantageously be used as a network of microlenses in simultaneous imaging applications such as endoscopy, or in simultaneous spectroscopy, in order for example to illuminate biological tissues by virtue of a multi-focusing of light on hundreds or even thousands of points very close to one another.

What is claimed is:

1. A method of manufacturing microlenses at the ends of unit optical fibres forming part of a multicore fibre, comprising:

depositing a drop of photopolymerisable solution on a first end of the multicore fibre;
adapting a size of the drop;
illuminating a light source centred on a given wavelength at a second end of the multicore fibre such that the drop is selectively polymerized; and
rinsing the first end with a solvent solution in order to obtain a network of unit optical fibres, each unit optical fibre provided with a microlens at the first end of the multicore fibre, wherein the microlenses are configured to physically separate from one another.

2. The method according to claim 1, further comprising adapting a height of the drop according to its composition so that the height is less than a distance measured substantially along a longitudinal axis of the multicore fibre, between the first end and a proximal surface containing intersections of light beams issuing from each unit optical fibre.

3. The method according to claim 1, wherein the adaptation of the size of the drop includes a reduction of its thickness to approximately a few micrometers.

4. The method according to claim 1, wherein the adaptation of the size of the drop comprises a reduction in angle A between an end plane of the multicore fibre and a plane of a tangent to the drop at a periphery, to a value of less than about 10°.

5. The method according to claim 1, wherein the photopolymerisable solution comprises a photopolymerisable monomer; an agent of a methyldiethanolamine type; and a photoinitiator agent of an eosin type.

6. The method according to claim 1, wherein the photopolymerisable solution is a radical photopolymerisable solution having a given photopolymerisation threshold, the radical photopolymerisable solution being sensitive to and induced by an inhibitor.

7. The method according to claim 1, wherein the light source has a wavelength of about 0.532 micrometers.

8. The method according to claim 7, wherein the second end is illuminated for a period of about one second.

9. The method according to claim 1, wherein the adaptation of the size of the drop includes placing the flat end of an external element of a fibre type having substantially the same outside diameter as the drop in contact with a distal curved end of the drop adhering to the first end of the multicore fibre; moving the ends away once the flat end has been loaded with a quantity of photopolymerisable solution; measuring the thickness and/or the angle A of the drop on the first end of the multicore fibre; and then, according to a result of the measurement, once again bringing the two ends closer together after any trace of solution has been removed from the flat end of the external element.

10. The method according to claim 1, further comprising obtaining a bundle of unit optical fibres including all or some of the fibres provided at one end with the microlens.

11. The method according to claim 10, wherein the bundle of optical fibres are utilized in medical or multiplexed imaging and/or in optical fibre coupling.

12. The method according to claim 5, wherein the photopolymerisable monomer is a PETIA type monomer.

13. The method according to claim 12, comprising about 4% by weight of the methyldiethanolamine type agent, and about 0.5% by weight of the eosin type photoinitiator agent.

14. The method according to claim 6, wherein the inhibitor is selected from the group consisting of oxygen, 4-methoxyphenol, and combinations thereof.

* * * * *